May 17, 1932.  R. L. SMITH  1,858,471
EXPANSION VALVE
Filed May 28, 1930
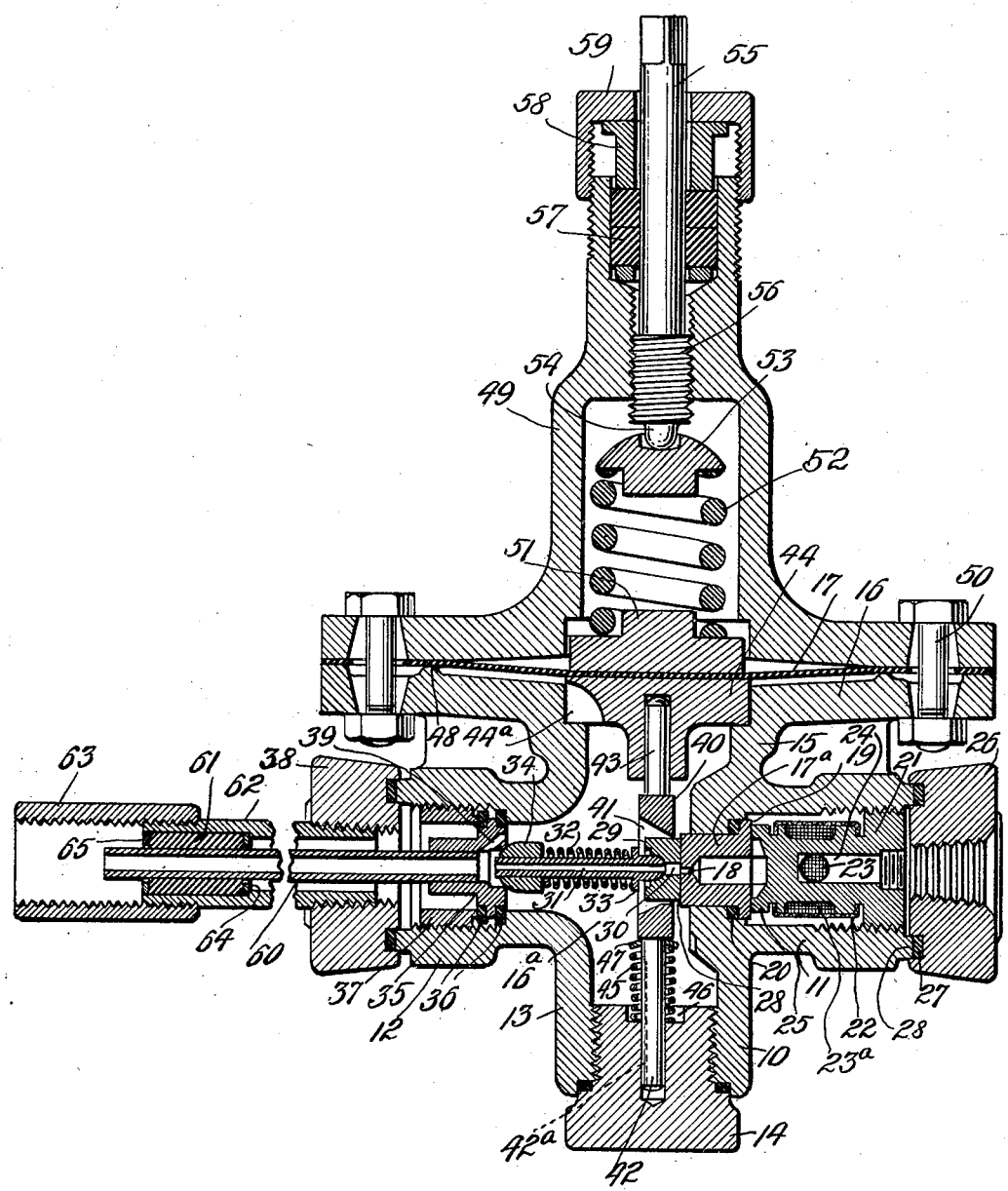
INVENTOR
ROMEYN L. SMITH
BY
Archibald Coy
ATTORNEY Patented May 17, 1932

1,858,471

UNITED STATES PATENT OFFICE

ROMEYN L. SMITH, OF NEW BRUNSWICK, NEW JERSEY, ASSIGNOR TO BRUNSWICK-KROESCHELL COMPANY, OF NEW BRUNSWICK, NEW JERSEY, A CORPORATION OF NEW JERSEY

EXPANSION VALVE

Application filed May 28, 1930. Serial No. 456,328.

The invention relates to an improvement in valves and more particularly to an improvement in expansion valves automatically opening and closing in accordance with predetermined pressure conditions.

Expansion valves as usually constructed accumulate frost and ice on their exterior surfaces which are the source of considerable annoyance, and it has accordingly been proposed heretofore to construct expansion valves so that frost and ice will not accumulate on them. So far as I am aware however such valves must be located in definite predetermined positions, otherwise frost and ice will accumulate on their exterior surfaces. In other words, it has been found in the operation of such valves that if the valve is located in one position no frost accumulates, but if the valve is located in a reversed position frost will accumulate on it. The object of the present invention is to provide an expansion valve of such construction that it can be located in any position without liability of frost accumulating on its exterior surfaces. To this end the invention consists in the improved expansion valve hereinafter fully described and particularly pointed out in the appended claims.

The preferred form of the invention is illustrated in the accompanying drawing which is a longitudinal section through the improved expansion valve. Referring to the drawing, 10 designates a valve body having at opposite sides a tubular inlet portion 11 and a tubular outlet portion 12, said valve body being provided at its bottom with a downwardly extending tubular portion 13 closed by a screw plug 14 and at its top with a tubular portion 15 terminating at its upper end in an annular flange 16, concave at its upper side and serving to support a steel diaphragm 17, which is preferably built up of laminations. At the inner end of the tubular portion 11 there is a cylindrical opening connecting such tubular portion with a chamber 16a at the interior of the body 10. Closely fitting in such cylindrical opening is a sleeve 17a closed at its inner end except for a port 18 and provided at its outer end with a flange 19 fitting in an annular recess. The inner surface of said inner end is flat and serves as a valve seat as will be brought out more fully hereinafter.

Interposed between said flange 19 and the bottom of the recess is a packing ring 20 to prevent leakage around the sleeve 17a, and the sleeve is held in position by means of a scale screen nut 21 of which the outer end is threaded into the internally threaded tubular portion 11. Said scale screen nut 21 has a reduced inner end with two annular flanges the exterior thereof to support a scale screen 22 and providing between said flanges an annular channel 23a to which fluid is supplied through one or more openings 23 communicating with a central bore 24 extending to the outer end of said screen nut. At its inner end the screen nut is provided with projections 25 to engage the flange 19 of the sleeve 17a and between which projections fluid passes to the interior of the sleeve.

Connection with a suitable source of supply of liquid refrigerant is provided by means of a member 26 secured to the tubular portion 11 in any suitable manner, said member 26 being provided with an internally threaded bore for connection with a suitable conduit or pipe and also with a circular groove adapted to receive a washer 27 of suitable material and also an annular flange 28 projecting from said tubular portion 11.

As already pointed out, the inner end of the sleeve 17a has a plane surface at the inside of the chamber and constitutes a valve seat 28 having a port 18. The valve seat 28 cooperates with a slide valve 29 provided with a port 30 to be moved into and out of position for communication with the port 18 in the valve seat. At the opposite side with respect to the valve seat, the slide valve 29 is provided with a ball shaped socket communicating with the port 30. The inner end of a tubular valve spring guide or spindle 31 is tightly seated in the socket to prevent leakage between them. The spindle 31 is surrounded by a helical compression spring 32 operatively connected at its inner end with said spring guide to urge the guide against the valve and thereby hold the latter in contact with valve seat 28. As here shown the end of the spring towards the valve engages an annular flange 33 on the guide. It will be seen that the slide valve 29 serves to make and break a connection between the port 18 in the valve seat 28 and the passage in the tubular spindle or member 31.

At its other end, the spring 32 engages a button 34 closely fitting over the tubular guide 31 but slidable therealong, the outer end of the button being ball shaped to fit closely against a corresponding surface at the inner end of an outlet bushing 35 which is provided at its inner end with an annular flange having annular recesses at opposite sides thereof to receive the inner edges of suitable heat insulating washers 36, which may be made of fibre. These washers 36 extend outwardly beyond the central portion of the annular flange so as to prevent contact between the metal of the bushing 35 and the metal of the tubular outlet portion 12 of the valve body.

The inner washer 36 is held in engagement with a shoulder at the interior of the said tubular portion 12 by means of a hollow nut 37 screwed into an enlarged interior threaded portion of the bore of the tubular portion 12. It should be understood that the hollow nut 37 is spaced from the outer and smaller portion of the bushing 35 and that at its inner end it engages the outer washer 36 but not the metal of the sleeve. The outer end of the outlet portion 12 may be closed by means of a member 38 similar to the member 26 and connected with the outlet portion 12 in the same general manner as the member 26 is connected with the inlet portion 11. The sleeve 35 is provided near the outer end of the valve guide 31 with a passage 39 extending from the interior of the chamber 16a forwardly and inwardly so that this passage and the central bore of the bushing converge towards the outlet of the chamber 16a. Said passage 39 provides communication between the interior of the bushing and the chamber. The arrangement is such that the liquid flowing rapidly from the interior of the spindle 31 to the outlet produces an ejector action and tends to keep liquid refrigerant out of the passage 39 and therefore out of the chamber.

Control of the slide valve 29 is preferably effected by means of a valve driver or operating member 40 which has a valve receiving opening 41 flared outwardly from the inner side of said member, that is the side adjacent to the valve seat, and of such dimensions that the valve 29 fits closely in the small end of said flared opening 41. For guiding and operating it, the valve driver is provided at its lower end with a spindle 42 guided in a bore in the plug 14 at the bottom of the valve body and at its upper end with an upwardly extending spindle 43 seated in a corresponding bore at the lower side of a pusher plate 44 which is guided in a suitable bore in the upper tubular portion 15 and is held in engagement with the diaphragm 17 by suitable means, such as a helical spring 45 surrounding the lower spindle 42 and interposed between the lower end of the valve driver 40 and the bottom of an annular recess 46 in the plug 14. Preferably the pressure conditions at the bottom of the bore in the plug 14 are maintained substantially the same as those in the chamber 16a. This may be done by providing suitable communication therebetween, for example, a longitudinal groove 42a in the spindle 42 as indicated by a dotted line in the drawing. Communication between the chamber 16a and the lower side of the diaphragm may be provided in any suitable manner, as by means of an opening 44a which allows the fluid in the chamber to act against the lower surface of the diaphragm even when the pusher plate is in the lower position. Preferably the spring 45 instead of acting directly against the lower end of the member 40 engages the lower side of a dished washer 47 which is convex at its upper side.

The diaphragm 17 is preferably supported by an annular rib 48 extending upwardly from the annular flange 16 and is held in position against such rib 48 by means of an annular lower end of a cover 49 which is secured to the annular flange 16 in any suitable manner as by bolts 50. Guided in a suitable bore in the lower part of the cover 49 is a pressure or presser member or plate 51 which is pressed against the upper side of the diaphragm 17 by means of a suitable compression spring 52 engaged at its upper end by a spring cap 53 having at its upper side a recess to receive the lower end 54 of a pressure regulating stem 55 having an exteriorly threaded part 56 threaded in a bore in the upper part of the cover 49. Preferably leakage along the pressure regulating stem is prevented by suitable means including packing material 57, a packing gland 58, and a packing box nut 59.

From the valve spring guide 31 the fluid passes to a delivery tube 60 which fits closely in the bore of the outlet bushing 35 and is supported at its outer end by a heat insulating bushing 61, preferably of fibre, mounted in an enlarged portion of the bore of an outlet nipple 62 threaded at its inner end in the member 38 and at its outer end in a tube 63 leading to the expansion coils. The heat insulating bushing 61 is held in position at its inner end by a washer 64 which is of the same exterior diameter as bushing 61 but of greater interior diameter so as to be spaced from the delivery tube 60. This metal washer 64 engages a shoulder formed at the inner end of the enlarged portion of the bore receiving the bushing 61. At its outer end the bushing 61 is engaged by a washer 65 similar to the washer 64, and the washer 65 may be held in position in any suitable manner as by turning in or riveting over the material at the corresponding end of the nipple 62.

Not only is the delivery tube 60 thermally insulated by the insulating washers but it is also insulated by inert gas in the space between the delivery tube and the nipple.

It will be seen that according to the present invention, there is provided an inner passage conveying, through what may be called a flexible connection, low temperature liquid from the valve at the inlet side of the chamber to a point in the connecting line at a distance from the valve and that this inner passage is separated from the outer air both where it passes through the chamber 16a and where it passes through the outlet portion 12 and the nipple 62, the only connection between the wall of the inner passage and the exterior parts being effected by means of heat insulating washers the space between the greater portion of the length of the walls being filled with inert gas. The pressure within the chamber 16a is substantially the same as in the expansion coils, and, during the operation of the apparatus, the velocity of the rapidly flowing liquid as it passes from valve spring guide 31 to the delivery tube 60 tends to produce an ejector action at the opening 39 and to prevent the accumulation of liquid in the chamber. Experience shows that there is no frosting of the valve body and it is, therefore, evident that there can be no liquid in the chamber 16a to evaporate and produce frost. Frosting of the expansion valve of the present invention is, therefore, prevented, due to the arrangement which provides an inner passage conveying low temperature liquid from the valve 29 to a point in the connecting line 63 at a distance from the valve. Experience shows that the non-frosting quality of this valve is retained regardless of the position of the valve, the load or other conditions.

The operation of the valve is substantially as follows:—As the pressure in the chamber 16a increases due to the rapid evaporation of the liquid refrigerant in the cooling coils, the diaphragm 17 is lifted and permits the valve 29 to be moved, by means of the valve driver 40 and the spring 45, to a position to close the inlet port 18. Then, as the pressure in the cooling coils decreases, the valve is again opened. In this manner the flow of refrigerant is reduced or increased. This tends to lower or raise the pressure in the chamber 16a, and to maintain a balance between the pressure exerted on the lower side of the diaphragm and the pressure exerted on the upper side by the spring 52. When the compressor shuts down and the pressure in the evaporating coils rises due to the evaporation of the liquid refrigerant, the diaphragm 17 rises sufficiently to cause the valve to close. When the pressure in the cooling coils is again lowered by the starting up of the compressor, the diaphragm will move downwardly under the action of the spring 52 and cause the valve to open. The evaporating pressure may be adjusted by means of the adjusting or regulating stem 55.

I claim:

1. A valve comprising a casing enclosing a chamber, a diaphragm constituting one wall of the chamber, an inlet and an outlet passage for said chamber, a seat with a port at said inlet passage, a diaphragm controlled member with a part to cooperate with the port in the said seat, and a tubular member extending from said outlet passage and controlled by said diaphragm controlled member as to communication with the port in the seat.

2. A valve comprising a seat provided with an inlet port, a movable member having a port movable across said inlet port to control the passage of fluid through said inlet port, an outlet conduit having a stationary inner end to receive fluid from the port in said movable member, and a flexible connection to maintain communication between said port in the movable member and the inner end of said conduit, irrespective of the position of the port in said movable member with reference to said inlet port.

3. A valve comprising a seat provided with an inlet port, a slide having a port to move across said inlet port to control the flow of fluid through said inlet port, a conduit having a stationary inlet to receive fluid from the port in said slide, and a flexible connection to maintain communication between said port in the slide and the stationary inlet of said conduit, irrespective of the position of the port in said slide with reference to said inlet port.

4. A valve comprising a seat provided with an inlet port, a slide with a port to communicate with said inlet port and a socket at the inner end of said port, a rigid tubular member having an end tightly fitting in said socket to prevent leakage between them, and resilient means maintaining such end of the tubular member in said socket.

5. A valve comprising a seat provided with an inlet port, a slide with a port to communicate with said inlet, a rigid tubular member having a ball and socket connection with the port in said slide, and a resilient means urging said tubular member toward slide to maintain said connection irrespective of the position of the slide.

6. A valve comprising a seat provided with a port, a slide with a port to be moved into and out of register with the port in said seat, a valve spring, a valve spring guide urged by the valve spring against said slide to hold it against said seat and having a longitudinal passage communicating with said port in the slide, and means for moving the adjacent end of said valve spring guide with said slide and thereby maintaining communication between the port in the slide and the longitudinal passage in said valve spring guide.

7. A valve comprising a seat provided with an inlet port, a slide provided with a ball-shaped socket at one side and a port connecting the socket with the other side of the slide and adapted to cooperate with the port in the seat, a tubular member having one end fitting in said ball-shaped socket, a spring mounted on said tubular member and operatively connected therewith adjacent the slide, a valve spring button slidable on said tubular member and engaging the outer end of said spring, and a stationary part provided with a passage and having at one end of said passage a socket into which the valve spring button fits.

8. A valve comprising a casing enclosing a chamber, a diaphragm constituting one wall of the chamber, an inlet and an outlet passage for said chamber, a seat with a port at said inlet passage, a slide with a port to cooperate with the port in the seat, a tubular member extending from said slide to said outlet passage and controlled by said slide as to communication with the port in the seat, a member connected with said tubular member at said outlet and provided with a passage communicating with said chamber, and diaphragm controlled means for operating the slide.

9. A valve comprising a casing enclosing a chamber and having an inlet and an outlet, a diaphragm constituting one wall of the chamber, a diaphragm controlled member for controlling said inlet, a delivery tube connected with said outlet but thermally insulated therefrom, and an outer tube surrounding said delivery tube, said outer tube being connected with said casing and thermally insulated from said delivery tube.

10. A valve comprising a chamber, a diaphragm constituting one wall of the chamber, a passage for conducting fluid under pressure from the inlet of said valve to the outlet, a valve controlled by said diaphragm to control the passage of fluid through said passage, a nipple connected with said outlet, a delivery tube to receive fluid from said passage, said delivery tube being located in said nipple and thermally insulated therefrom, and a connection between said delivery tube and said chamber to maintain the pressure in the latter substantially the same as in said delivery tube.

11. A valve comprising a casing enclosing a chamber, a diaphragm constituting one wall of the chamber, an inlet and an outlet passage for said chamber, a seat provided with a port to admit fluid from said inlet passage, a member controlled by said diaphragm and controlling the admission of fluid through said port, means including a conduit having a passage for carrying fluid from said port to said outlet, a connection between the outlet end of said passage and said chamber to determine the pressure at the inner surface of said diaphragm, and means for discharging the fluid from the outer end of said passage to the outside of said casing including an outer tube projecting from said outlet and an inner tube thermally insulated from the outlet of the casing and from the outer tube and serving to conduct from the valve the fluid passing therethrough.

12. A valve comprising a casing enclosing a chamber, a diaphragm constituting one wall of the chamber, an inlet and an outlet passage for said chamber, a seat provided with a port to admit fluid from said inlet passage, a slide controlled by said diaphragm and controlling the admission of fluid through said port, a member extending across said chamber and having a passage to carry fluid admitted through said port to said outlet, a connection between the outer end of said passage and said chamber to determine the pressure at the inner surface of said diaphragm, and means for discharging the fluid from the outer end of said passage to the outside of said casing including an outer tube projecting from said outlet and an inner tube thermally insulated from the outlet of the casing and from the outer tube and serving to conduct from the valve the fluid passing therethrough.

13. A valve comprising a chamber, a diaphragm constituting one wall of the chamber, a passage for conducting fluid under pressure from the inlet of said valve to the outlet, a valve controlled by said diaphragm to control the passage of fluid through said passage, a delivery tube to receive fluid from said passage, and a passage between said delivery tube and said chamber to maintain the pressure in the latter substantially the same as in said delivery tube, the last mentioned passage being inclined toward the axis of the first passage to produce ejector action.

ROMEYN L. SMITH.